(12) United States Patent
Hu et al.

(10) Patent No.: US 12,119,675 B2
(45) Date of Patent: Oct. 15, 2024

(54) FEEDBACK CONTROL SCHEMES FOR WIRELESS POWER TRANSFER CIRCUITS

(71) Applicant: Apple Inc., Cupertino, CA (US)

(72) Inventors: Zhiyuan Hu, Santa Clara, CA (US); Alin I. Gherghescu, Campbell, CA (US); Arash Mehrabi, Menlo Park, CA (US); Dmitry Berdnikov, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/834,180

(22) Filed: Jun. 7, 2022

(65) Prior Publication Data
US 2022/0407369 A1   Dec. 22, 2022

Related U.S. Application Data

(60) Provisional application No. 63/212,252, filed on Jun. 18, 2021.

(51) Int. Cl.
*H02J 50/80*   (2016.01)
*H02J 7/00*    (2006.01)
*H02J 50/10*   (2016.01)

(52) U.S. Cl.
CPC .......... *H02J 50/80* (2016.02); *H02J 7/00712* (2020.01); *H02J 50/10* (2016.02)

(58) Field of Classification Search
None
See application file for complete search history.

(56) References Cited

U.S. PATENT DOCUMENTS

| | | | |
|---|---|---|---|
| 11,735,959 B2 | 8/2023 | Yoshida et al. | |
| 2013/0307348 A1* | 11/2013 | Oettinger | H01F 38/14 307/104 |
| 2014/0253275 A1* | 9/2014 | Shijo | H01F 27/22 29/605 |
| 2018/0219402 A1 | 8/2018 | Chen | |
| 2021/0305845 A1* | 9/2021 | Tritschler | H02M 7/06 |
| 2022/0131413 A1 | 4/2022 | Yoshida et al. | |

FOREIGN PATENT DOCUMENTS

| | | |
|---|---|---|
| EP | 3599700 B1 | 12/2020 |
| JP | 2015-089187 A | 5/2015 |
| JP | 2017-169274 A | 9/2017 |
| JP | 6719682 B1 | 7/2020 |
| WO | WO 2020/020875 A1 | 1/2020 |
| WO | WO 2020/202422 A1 | 10/2020 |

* cited by examiner

*Primary Examiner* — Daniel Kessie
(74) *Attorney, Agent, or Firm* — BakerHostetler (57) ABSTRACT

Portable electronic devices such as cellular telephones, wristwatch devices, tablet computers, wireless earbuds, and other portable devices use batteries. The batteries in these devices may be charged using a wireless power system. For example, a user may place devices such as tablet computers and cellular telephones on a wireless charging puck or mat to wirelessly charge these devices. Wireless power systems include a power transmitting device and a power receiving device. Coils in the power transmitting and receiving devices are used to transmit and receive wireless power signals. The coupling between the transmitting and receiving coils may affect the wireless charging efficiency and the power produced in the receiving device. Disclosed herein are feedback control schemes to optimize efficiency of wireless power transfer systems.

12 Claims, 6 Drawing Sheets

FIG. 7

FEEDBACK CONTROL SCHEMES FOR WIRELESS POWER TRANSFER CIRCUITS

PRIORITY

This application claims the benefit under 35 U.S.C. § 119(e) of U.S. Provisional Patent Application Ser. No. 63/212,252, entitled "FEEDBACK CONTROL SCHEMES FOR WIRELESS POWER TRANSFER CIRCUITS," filed on Jun. 18, 2021, which is incorporated herein by reference in its entirety.

TECHNICAL BACKGROUND

The present disclosure relates generally to wireless charging, and more particularly, to feedback control schemes for wireless power transfer in wireless power systems.

BACKGROUND

Portable electronic devices such as cellular telephones, wristwatch devices, tablet computers, wireless earbuds, and other portable devices use batteries. The batteries in these devices may be charged using a battery charging system. To enhance convenience for users, wireless power systems have been provided that allow batteries in portable electronic devices to be charged wirelessly. Coils in power transmitting and receiving devices may be used to transmit and receive wireless power signals. The coupling between the transmitting and receiving coils may affect the wireless charging efficiency and the power produced in the receiving device.

The foregoing background discussion is intended solely to aid the reader. It is not intended to limit the innovations described herein. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

Wireless power systems include a power transmitting device and a power receiving device. Coils in the power transmitting and receiving devices are used to transmit and receive wireless power signals. The coupling between the transmitting and receiving coils may affect the wireless charging efficiency and the power produced in the receiving device.

An exemplary wireless power receiving device may be configured to receive wireless power signals from a wireless power transmitting device. The wireless power receiving device may include a wireless power transfer coil. In addition, the receiving device includes rectifier circuitry coupled to the wireless power transfer coil and configured to rectify signals from the wireless power transfer coil into output voltage. The receiving device also includes control circuitry that is configured to regulate the rectifier output voltage at a target rectifier output voltage level, receive from the wireless power transmitting device, a status message indicative of an inverter input voltage, and adjust the target output voltage based on the status of the inverter input voltage.

Another exemplary wireless power receiving device may be configured to receive wireless power signals from a wireless power transmitting device. The wireless power receiving device may include a wireless power transfer coil. In addition, the receiving device includes rectifier circuitry coupled to the wireless power transfer coil and configured to rectify signals from the wireless power transfer coil into output voltage. The receiving device also includes control circuitry that is configured to measure a characteristic of the rectifier circuitry, determine a target rectifier output voltage level based on the measured characteristic of the rectifier circuitry, and dynamically regulate the rectifier output voltage at the target rectifier output voltage level.

Another exemplary wireless power receiving device may be configured to receive wireless power signals from a wireless power transmitting device. The wireless power receiving device may include a wireless power transfer coil. In addition, the receiving device includes rectifier circuitry coupled to the wireless power transfer coil and configured to rectify signals from the wireless power transfer coil into output voltage. The receiving device also includes control circuitry that is configured to regulate the rectifier output voltage at a target rectifier output voltage level. The control circuitry may also ask the wireless power transmitting device for information indicative of an operating condition of an inverter of the wireless power transmitting device, wherein the wireless power transfer coil is receiving wireless power signals transmitted by the wireless power transmitting device using the inverter.

BRIEF DESCRIPTION OF THE DRAWINGS

The foregoing summary and following detailed description are better understood when read in conjunction with the appended drawings. In the drawings, for purposes of explanation, numerous specific details are set forth in order to provide an understanding of the variations in implementing the disclosed technology. However, the instant disclosure may take many different forms and should not be construed as limited to the specific examples disclosed in the drawings. When practical, like numbers refer to like elements throughout. In the drawings.

DETAILED DESCRIPTION

Portable electronic devices such as cellular telephones, wristwatch devices, tablet computers, wireless earbuds, and other portable devices use batteries. The batteries in these devices may be charged using a wireless charging system. For example, a user may place devices such as wristwatch devices and cellular telephones on a wireless charging mat to wirelessly charge these devices.

Figure 1:
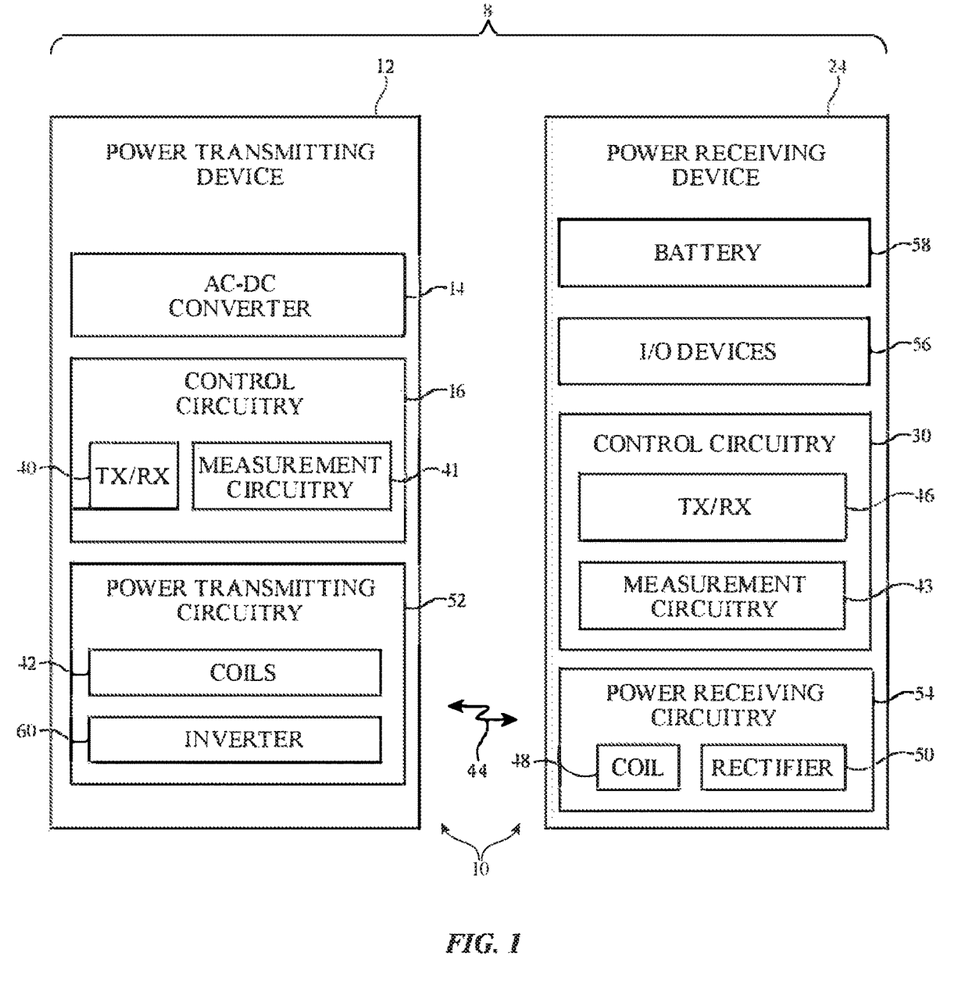
FIG. 1 is a schematic diagram of an illustrative wireless power system in accordance with an aspect of the present disclosure.

An illustrative wireless power system is shown in FIG. 1. Wireless power system 8 includes electronic devices 10. Electronic devices 10 include electronic devices that transmit wireless power and/or electronic devices that receive wireless power. Because battery charging is a common use of received power, wireless power transfer operations in system 8 are sometimes referred to as battery charging operations. However, power may also be provided to a receiving device to operate a display or other circuitry in the receiving device without battery charging, if desired. Accordingly, the wireless power may be used for charging batteries in electronic devices and in supplying power to other device components.

Charging may be performed by wirelessly transferring power (e.g., using inductive charging) from a power transmitting device such as device 12 to a power receiving device such as device 24. Coils in the power transmitting and receiving devices may be used to transmit and receive wireless power signals. In the example of FIG. 1, power is being transferred wirelessly using wireless power signals 44. The wireless charging efficiency of device 24 is affected, in part, by the coupling between coil 42 on device 12 and coil 48 on device 24 (also referred to herein as the coupling between transmitting device 12 and receiving device 24).

The physical alignment of coils 42 and 48 in the X, Y, and Z dimensions affects the electromagnetic coupling. An offset of x=0, y=0 means the centers of coils 42 and 48 are aligned in the X-Y plane. An offset of z=0 may mean the distance between the surfaces of the two devices containing coils 42 and 48 is at a minimum distance. For example, neither the power transmitting device 12 nor the power receiving device 24 has a case that separates the two devices. An offset of (x, y, z)=(0, 0, 0) may be referred to as a best coupling condition. In addition, an offset of (r, z)=(0, 0), where "r" is the radius of offset between the centers of coil 42 and coil 48, may also be referred to as a best coupling condition.

The electromagnetic coupling between coil 42 on device 12 and coil 48 on device 24 may be designed to operate across a positional tolerance range. In one example, the wireless power transfer system may be optimized for the centers of coils 42 and 48 to be aligned within 5 mm in the X-Y plane and the distance between surfaces of devices 12 and 24 to be within 5 mm in the Z direction. Such design criteria may be referred to as a "5 mm by 5 mm" offset. In this example, a "good" coupling would occur when the center of coil 48 of power receiving device 24 is aligned within 5 mm by 5 mm of center of coil 42 of the power transmitting device 12. In such an orientation, good charging may result because the system is designed to transmit full power from device 12 to device 24 when the coils are offset by +/−5 mm. Continuing with the 5 mm-by-5 mm design example, a coupling where the power transmitting and receiving coils are offset by more than the +/−5 mm design criteria may be classified as a "bad" coupling. A person of skill in the art will recognize that the wireless power transfer system is not limited by this exemplary positional tolerance range and may be designed for alternative ranges (e.g., +/−1 mm, +/−2 mm, +/−3 mm, +/−4 mm, +/−6 or more, etc.) without departing from the scope and spirit of the invention as described herein.

A good coupling between the transmitting and receiving coils may promote efficient wireless power transfer. A bad coupling between the transmitting and receiving coils may negatively affect the wireless charging efficiency and the power produced in receiving device 24. Disclosed herein are feedback control schemes to optimize efficiency of wireless power transfer systems.

During operation of system 8, wireless power transmitting device 12 wirelessly transmits power to one or more wireless power receiving devices such as device 24. The wireless power receiving devices may include electronic devices such as wristwatches, cellular telephones, tablet computers, laptop computers, ear buds, battery cases for ear buds and other devices, tablet computer pencils (e.g., styluses) and other input-output devices (e.g., accessory devices), wearable devices, or other electronic equipment. The wireless power transmitting device may be an electronic device such as a wireless charging puck or mat that has a charging surface (e.g., a planar charging surface) that receives portable devices to be charged, a tablet computer or other portable electronic device with wireless power transmitting circuitry (e.g., one of devices 24 that has wireless power transmitting circuitry), or other wireless power transmitting device. The wireless power receiving devices use power from the wireless power transmitting device for powering internal components and for charging internal batteries.

As shown in FIG. 1, wireless power transmitting device 12 includes control circuitry 16. Wireless power receiving device 24 includes control circuitry 30. Control circuitry in system 8 such as control circuitry 16 and control circuitry 30 (and/or control circuitry in other devices 10) is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in operating the control loops discussed herein, selecting coils, adjusting the phases and magnitudes of coil drive signals, determining power transmission levels, processing sensor data and other data, processing user input, handling negotiations between devices 12 and 24, sending and receiving in-band and out-of-band data, making measurements, starting and stopping charging operations, turning devices 10 on and off, placing devices 10 in low-power sleep modes, and otherwise controlling the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid-state drives), one or more removable flash drives or other removable media, or the like. Software stored on the non-transitory computer readable storage media may be executed on the processing circuitry of devices 10 (e.g., control circuitry 16 and/or 30). The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging puck or mat that includes power adapter circuitry), may be a wireless charging puck or mat that is coupled to a power adapter or other equipment by a cable, may be a portable electronic device (cellular telephone, tablet computer, laptop computer, etc.), may be equipment that has been incorporated into furniture, a vehicle, or other system, or may be other wireless power transfer equipment. Illustrative configurations in which wireless power transmitting device 12 is a wireless charging puck, mat, or portable electronic device are sometimes described herein as an example.

Power receiving device 24 may be a portable electronic device such as a wristwatch, a cellular telephone, a laptop computer, a tablet computer, an accessory such as an earbud, a tablet computer input device such as a wireless tablet computer pencil, a battery case, or other electronic equipment. Power transmitting device 12 may be coupled to a wall outlet (e.g., an alternating current power source), may have a battery for supplying power, and/or may have another source of power. Power transmitting device 12 may have an alternating-current (AC) to direct-current (DC) power converter such as AC-DC power converter 14 for converting AC power from a wall outlet or other power source into DC power. In some configurations, AC-DC power converter 14 may be provided in an enclosure (e.g., a power brick enclosure) that is separate from the enclosure of device 12 (e.g., a wireless charging mat enclosure or portable electronic device enclosure) and a cable may be used to couple DC power from the power converter to device 12. DC power may be used to power control circuitry 16.

During operation, a controller in control circuitry 16 may use power transmitting circuitry 52 to transmit wireless power to power receiving circuitry 54 of device 24. Power transmitting circuitry 52 may have switching circuitry (e.g., inverter circuitry 60 formed from transistors) that is turned on and off based on control signals provided by control circuitry 16 to create AC current signals through one or more transmit coils 42. Coils 42 may be arranged in a planar coil array, such as in configurations in which device 12 is a wireless charging mat, or may be arranged in other configurations. In some arrangements, device 12 may have a single coil. In arrangements in which device 12 has multiple coils, the coils may be arranged in one or more layers. Coils in different layers may or may not overlap with each other.

As the AC currents pass through one or more coils 42, a time varying electromagnetic (e.g., magnetic) field (signals 44) is produced that is received by one or more corresponding receiver coils such as coil 48 in power receiving device 24. When the time varying electromagnetic field is received by coil 48, corresponding alternating-current currents are induced in coil 48. Rectifier circuitry such as rectifier 50, which contains rectifying components such as synchronous rectification metal-oxide-semiconductor transistors arranged in a bridge network, converts received AC signals from coil 48 into DC voltage signals for powering device 24.

The DC voltages produced by rectifier 50 may be used in powering (charging) an energy storage device such as battery 58 and may be used in powering other components in device 24. For example, device 24 may include input-output devices 56 such as a display, touch sensor, communications circuits, audio components, sensors, components that produce electromagnetic signals that are sensed by a touch sensor in a tablet computer or other device with a touch sensor (e.g., to provide pencil input, etc.), and other components and these components may be powered by the DC voltages produced by rectifier 50 (and/or DC voltages produced by battery 58 or other energy storage device in device 24).

Device 12 and/or device 24 may communicate wirelessly (e.g., using in-band and out-of-band communications). Device 12 may, for example, have wireless transceiver (TX/RX) circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12. In some configurations, devices 10 may communicate through local area networks and/or wide area networks (e.g., the internet).

Wireless transceiver circuitry 40 may use one or more coils 42 to transmit in-band signals to wireless transceiver circuitry 46 that are received by wireless transceiver circuitry 46 using coil 48. Any suitable modulation scheme may be used to support in-band communications between device 12 and device 24. With one illustrative configuration, frequency-shift keying (FSK) is used to convey in-band data from device 12 to device 24 and amplitude-shift keying (ASK) is used to convey in-band data from device 24 to device 12. Power may be conveyed wirelessly from device 12 to device 24 during these FSK and ASK transmissions. Other types of in-band communications may be used, if desired.

During wireless power transmission operations, circuitry 52 supplies AC drive signals to one or more coils 42 at a given power transmission frequency. The power transmission frequency may be, for example, a predetermined frequency of about 125 kilohertz (kHz), at least 80 kHz, at least 100 kHz, less than 500 kHz, less than 300 kHz, less than 150 KHz, between 80 kHz and 150 kHz, or other suitable wireless power frequency. In some configurations, the power transmission frequency may be negotiated in communications between devices 12 and 24. In other configurations, the power transmission frequency may be fixed.

During wireless power transfer operations, while power transmitting circuitry 52 is driving AC signals into one or more of coils 42 to produce electromagnetic signals 44 at the power transmission frequency, wireless transceiver circuitry 40 may use FSK modulation to transmit data and information over the driving AC signals 44. In device 24, coil 48 is used to receive electromagnetic signals 44. Power receiving circuitry 54 uses the received signals on coil 48 and rectifier 50 to produce DC power. At the same time, wireless transceiver circuitry 46 uses FSK demodulation to extract the transmitted in-band data from signals 44. This approach allows FSK data (e.g., FSK data packets) to be transmitted in-band from device 12 to device 24 with coils 42 and 48 while power is simultaneously being wirelessly conveyed from device 12 to device 24 using coils 42 and 48. Other types of in-band communications between device 12 and device 24 may be used, if desired.

In-band communications between device 24 and device 12 may use ASK modulation and demodulation techniques or other suitable in-band communications techniques. Wireless transceiver circuitry 46 transmits in-band data to device 12 by using a switch (e.g., one or more transistors in transceiver 46 that are coupled coil 48) to modulate the impedance of power receiving circuitry 54 (e.g., coil 48). This, in turn, modulates the amplitude of signal 44 and the amplitude of the AC signal passing through coil(s) 42. Wireless transceiver circuitry 40 monitors the amplitude of the AC signal passing through coil(s) 42 and, using ASK demodulation, extracts the transmitted in-band data from these signals that was transmitted by wireless transceiver circuitry 46. The use of ASK communications allows a stream of ASK data bits (e.g., a series of ASK data packets) to be transmitted in-band from device 24 to device 12 with coils 48 and 42 while power is simultaneously being wirelessly conveyed from device 12 to device 24 using coils 42 and 48.

Control circuitry 16 may have external object measurement circuitry 41 (sometimes referred to as foreign object detection circuitry or external object detection circuitry) that detects external objects on a charging surface associated with device 12. Circuitry 41 may detect foreign objects such as coils, paper clips, and other metallic objects and may detect the presence of wireless power receiving devices 24. During object detection and characterization operations, external object measurement circuitry 41 may be used to make measurements on coils 42 to determine whether any devices 24 are present on device 12 (e.g., whether devices 24 are suspected to be present on device 12). Measurement circuitry 43 in control circuitry 30 may be used in making current and voltage measurements in coil 48, and/or may be used in making other measurements on wireless power receiving circuitry 54. Measurement circuitry 41 in control circuitry 16 may be used in making current and voltage measurements in coil(s) 42, and/or may be used in making other measurements on wireless power transmitting circuitry 52. In scenarios where device 12 includes multiple coils 42, control circuitry 16 may perform measurements using each coil 42 in sequence and/or in parallel. Control circuitry 16 may compare measurements made using measurement circuitry 41 to predetermined characteristics associated with device 24 (e.g., predetermined characteristics associated with different types of devices 24 that control circuitry 16 uses to identify the type of device 24 that is being charged).

Figure 2:
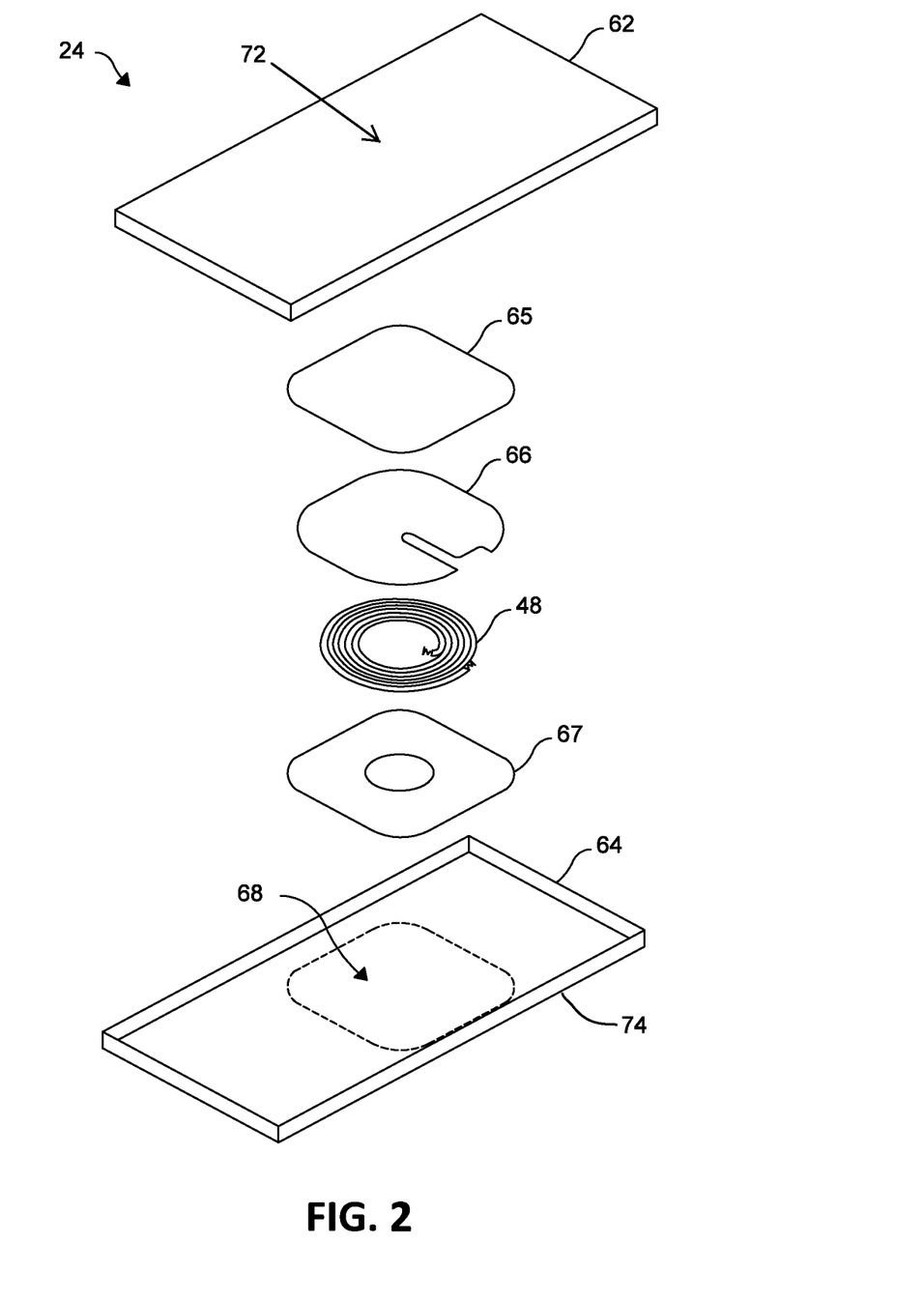
FIG. 2 is an exploded view of an illustrative wireless power receiving device with a coil for receiving wireless power in accordance with an aspect of the present disclosure.

FIG. 2 illustrates an exploded view of an exemplary wireless power receiving device 24. As shown in FIG. 2, wireless power receiving device 24 includes a housing such as a top housing 62 and a bottom housing 64 that can mate to define an interior cavity. Bottom housing 64 has a surface 74, also referred to herein as rear surface 74, that is placed on or over a charging surface of device 12 for wirelessly charging device 24. For example, both rear surface 74 and the charging surface 82 of device 12 may lie substantially parallel to the X-Y plane of FIG. 2 during wireless charging. A display screen (e.g., OLED display) or other input-output devices may be mounted to top housing 64 on surface 72, also referred to herein as upper surface 74.

Device 24 includes one or more coils 48 on the bottom housing 64 or within the interior cavity formed by the top housing 62 and the bottom housing 64. Housing 62, 64 may include metal materials, dielectric materials, or combinations of these and/or other materials. Device 24 may optionally include a ferromagnetic shield 66 and a thermal shield 65 in the vicinity of the coil 48. The thermal shield 65 may include a graphite or similar layer that provides thermal isolation between coil 48 and the battery and other components of the device 24. The ferromagnetic shield 66 may be positioned between the power coil 48 and the thermal shield 65. The ferromagnetic shield 66 may act as a magnetic field shield for redirecting magnetic flux to get higher coupling with coil 42 in the power transmitting device 12, which may result in improved charging efficiency. The device 24 may optionally include an adhesive component 67 that attaches coil 48 to bottom housing 64. The adhesive component 67 may be a single sheet of an adhesive material, such as pressure sensitive adhesive (PSA). The coil 48 may optionally be attached to bottom housing 64 within a cutout area 68 sized and shaped to receive coil 48.

In some situations, a user may place device 24 on a charging surface of device 12 so that rear surface 74 of the bottom housing 64 lies flat on the charging surface. In this exemplary configuration, a central axis of coil 48 extends parallel to a central axis of coil 42 in device 12 and a magnetic field from coil 42 may pass through coil 48. The magnetic field induces current on coil 48 that is used to wirelessly charge device 24.

Figure 3A:
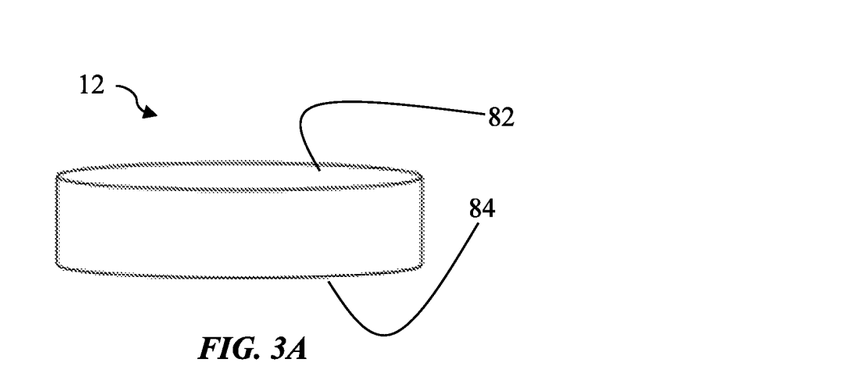
FIG. 3A is a perspective view of an illustrative wireless power transmitting device having a coil for charging wireless power receiving coils in accordance with an aspect of the present disclosure.
Figure 3B:
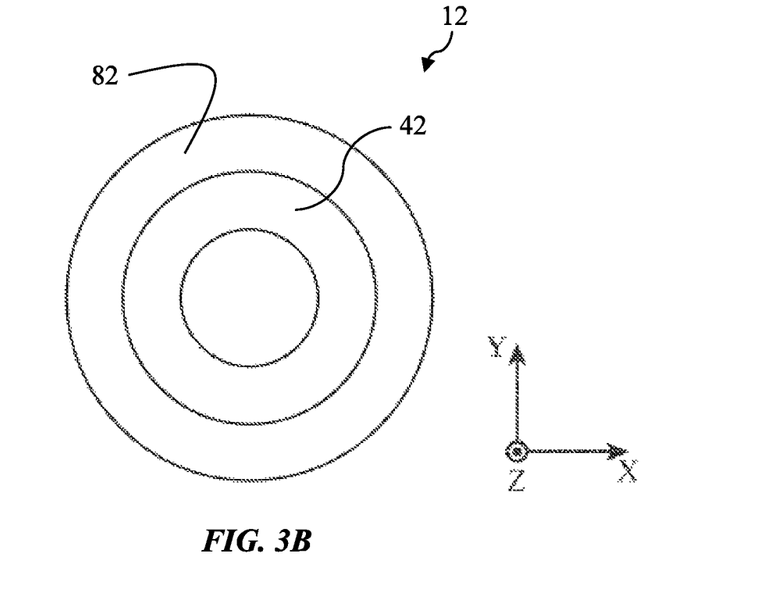
FIG. 3B is a top view of the wireless power transmitting device in FIG. 3A.

FIG. 3A is a perspective view and FIG. 3B is a top-down view of wireless power transmitting device 12 in an illustrative configuration. As shown, wireless power transmitting device 12 may have a coil 42 at charging surface 82 for transferring wireless power to coil 48 in power receiving device 24. With one illustrative configuration, device 12 is a wireless charging puck having a planar surface 84 that opposes charging surface 82 and that rests on an underlying surface such as a tabletop or other surface. A user may place device 24 onto charging surface 82 for charging device 24. Rear surface 74 of device 24 (FIG. 2) and charging surface 82 lie within planes that are substantially parallel to the X-Y plane of FIG. 3 during wireless charging.

Device 12 may drive coil 42 using a corresponding inverter 60 of FIG. 1 to produce a magnetic field. The magnetic field passes through coil 48 while device 24 is placed on charging surface 82 and induces current on coil 48 that serves to wirelessly charge device 24. Electromagnetic coupling between coil 42 and coil 48 is optimized when coil 48 is centered about coil 42. However, the size of coil 42 allows for some positional tolerance along the X and Y axes of FIG. 3 for the placement of device 24 on charging surface 82. As noted above, the wireless charging efficiency of device 24 is determined, in part, by the coupling between coil 42 on device 12 and coil 48 on device 24.

Figure 4:
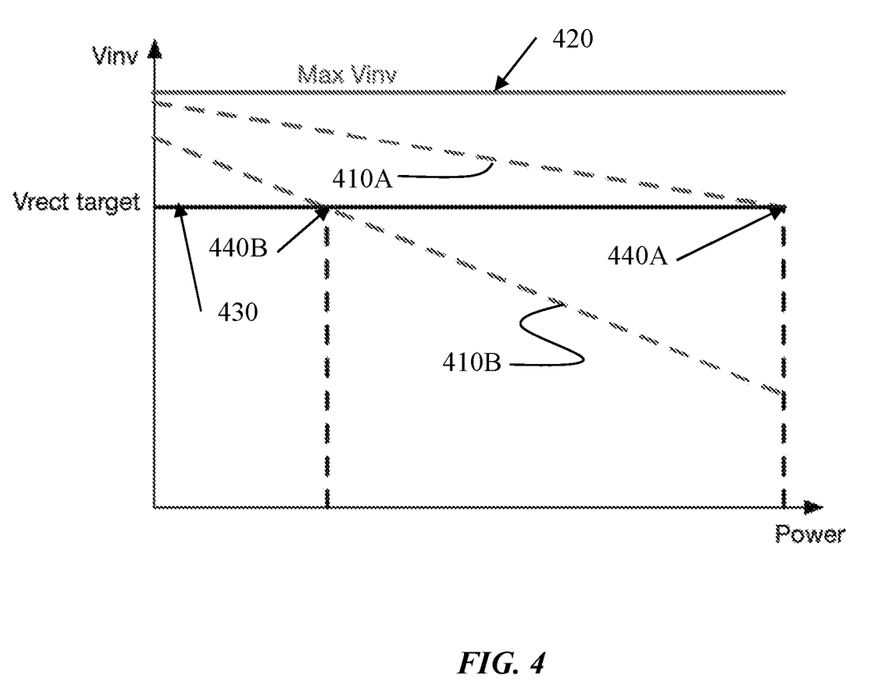
FIG. 4 is an illustrative plot of a prior art control method for wireless power transfer between power transmitting and receiving devices in the wireless power system shown in FIG. 1.

FIG. 4 is an illustrative plot of design constraints for prior art control method 400. FIG. 4 plots voltage on the Y axis and power on the X axis. FIG. 4 includes an exemplary rectifier output voltage ("Vrect") load line 410A which occurs with a good coupling between the power transmitting device 12 and power receiving device 24, and an exemplary Vrect load line 410B which occurs with a bad coupling between the power transmitting device 12 and power receiving device 24, both when the power transmitting device 12 inverter input voltage is at the maximum level. In the control method, the power receiving device attempts to regulate the rectifier output voltage at a constant target level 430. The regulation is achievable in the region that the load line 410A and 410B are above the regulation target 430, because the control loop can reduce the inverter input voltage to bring Vrect to the target level. The regulation is not achievable in the region where the load line 410B is below the target level 430, because the inverter input voltage cannot be increased further. With a good coupling, the system can achieve full power at 440A. However, with a bad coupling, the system can only achieve a reduced power at 440B, because the system is constrained by the maximum available inverter input voltage 420 and weak magnetic coupling between the wireless power transmitting and receiving devices.

Figure 5:
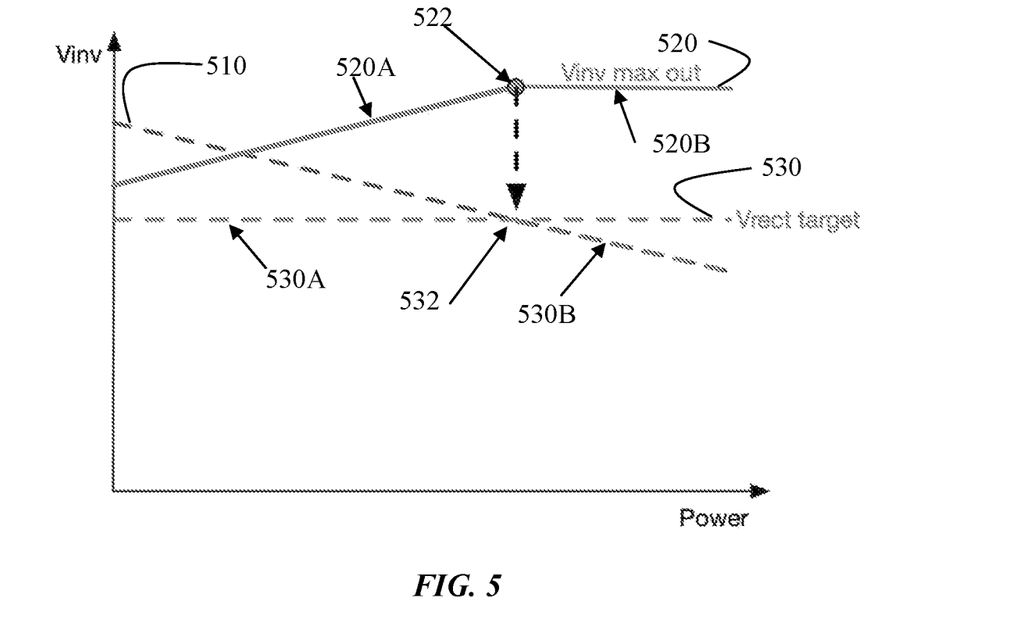
FIG. 5 is an illustrative plot of a feedback control scheme for a wireless power transfer system according to an aspect of the present disclosure.

FIG. 5 is an illustrative plot of a feedback control scheme for a wireless power transfer system according to an aspect of the present disclosure. A control loop implemented in the power receiving device 24 regulates the rectifier output voltage at a target level and allows the target rectifier output voltage to fold back (i.e., the target rectifier output voltage level is allowed to drop) when the power transmitting device inverter input voltage is at a maximum inverter input voltage level and the load increases.

FIG. 5 plots voltage on the Y axis and power on the X axis. FIG. 5 includes an exemplary rectifier output voltage ("Vrect") load line 510 which occurs with a bad coupling between the power transmitting device 12 and power receiving device 24, when the power transmitting device inverter input voltage is at its maxim level. The load illustrated in load line 510 transitions from a light load to a heavy load as you move along the X axis from left to right.

Curve 520 plots the power transmitting device inverter input voltage. Curve 520 includes a first portion 520A wherein, as the load represented in load line 510 increases, the inverter input voltage ramps up to a maximum inverter input voltage at 522. As discussed below, the control loop is able to regulate the rectifier output voltage at a target level (i.e., Vrect regulation is achievable by the power receiving device) in this region of the inverter input voltage curve 520. Curve 520 includes a second portion 520B wherein the Vrect regulation is not achievable because the inverter input voltage is at the maximum level and cannot be further increased. Further increasing load power will cause Vrect to drop below the target level 530.

Curve 530 plots the power receiving device rectifier target output voltage. As shown, curve 530 includes a first portion 530A wherein the power receiving device regulates the rectifier output voltage at a target rectifier output voltage level as the load increases along load line 510. Curve 530 includes a second portion 530B wherein the power receiving device is operating in a target rectifier output voltage fold back mode that is triggered at 532 when the power transmitting device inverter input voltage is at a maximum level and the load continues to increase. The target rectifier output voltage fold back mode allows the target rectifier output voltage level to drop, and a control loop adaptively adjusts the target rectifier output voltage to a new target rectifier output voltage level as the load further increases along line 510. While in the target rectifier output voltage fold back mode, the power receiving device control circuitry 30 may require the target rectifier output voltage to not drop below a predetermined minimum fold back rectifier output voltage level, thereby ensuring the rectifier 50 produces at least a minimum rectifier output power.

The target rectifier output voltage fold back mode control loop algorithm is implemented in the power receiving device 24. During the wireless power transfer, the power transmitting device 12 may communicate information indicative of the inverter input voltage status to the power receiving device 24. For example, the information may be a message that indicates the inverter input voltage is at a maximum inverter input voltage level. Alternatively, the information may identify the inverter input voltage value. The communication may be in a packet that carries the inverter input voltage information. In another example, the information may be a one-bit flag in an existing data packet to indicate whether the inverter input voltage has reached a maximum level. The communication from the power transmitter 12 to the power receiver 24 may take place using frequency shift keying (FSK) technique as discussed above. Alternatively, other types of in-band or out-of-band communications may be used, if desired.

In another example, the power receiving device 24 may ask the power transmitting device 12 for information indicative of an operating condition of an inverter of the power transmitting device, wherein the wireless power transfer coil 48 is receiving wireless power signals transmitted by the wireless power transmitting device 12 using the inverter. In addition, the information may comprise a status indicative of whether the inverter of the wireless power transfer device 12 is operating at its maximum input voltage. If the power transmitting device 12 responds to the power receiving device 24 indicating that the inverter input voltage is at a maximum level, the power receiving device 24 may trigger the target rectifier output voltage fold back mode as discussed above to adaptively adjust the target rectifier output voltage while the inverter input voltage is at the maximum level.

Figure 6:
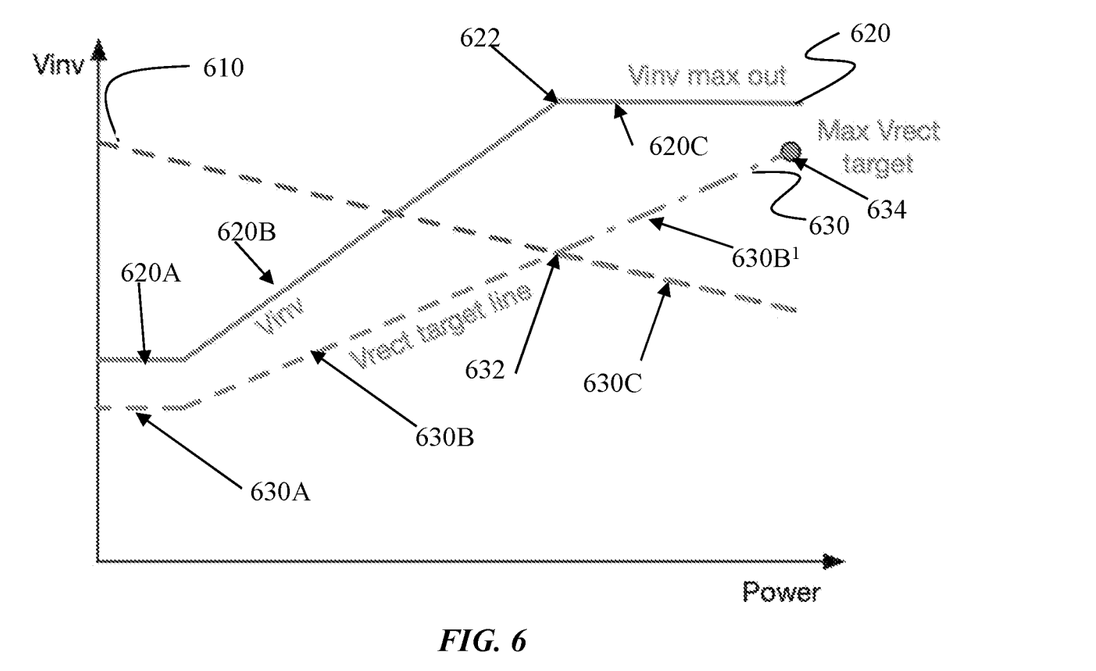
FIG. 6 is an illustrative plot of another feedback control scheme for a wireless power transfer system according to an aspect of the present disclosure.

FIG. 6 is an illustrative plot of another feedback control scheme 600 for a wireless power transfer system according to an aspect of the present disclosure. Control scheme 600 may improve charging efficiency at a light load and includes the target rectifier output voltage fold back mode discussed above. Light load charging efficiency may be improved by reducing the power transmitting device inverter input voltage for a light load. A control loop implemented in the power receiving device 24 dynamically controls the target rectifier output voltage as a function of either the power receiving device rectifier output power or output current. As discussed below, the target rectifier output voltage level is low at a light load and increases to a high target rectifier output voltage level as the load increases to a heavy load. The load and target rectifier output voltage may depend on the power receiving device 24 operating conditions. Exemplary operating conditions include the battery's state of charge, whether the device is playing a video or running a power-hungry application such as a videogame. The target rectifier output voltage function (curve 630) may be designed for the best coupling condition and allow for the target rectifier output voltage to fold back in worse coupling conditions, as shown in the target rectifier output voltage function curve portion 630C.

FIG. 6 plots voltage on the Y axis and power on the X axis. FIG. 6 includes an exemplary rectifier output voltage ("Vrect") load line 610 which occurs with a bad coupling between the power transmitting device 12 and power receiving device 24, when the power transmitting device inverter input voltage is at its maxim level. The load illustrated in load line 610 transitions from a light load to a heavy load as you move along the X axis from left to right.

Curve 620 plots the power transmitting device inverter input voltage. Curve 620 includes a first portion 620A wherein the transmitting device inverter input voltage is at a low level for a light load, as shown in the leftmost portion of load line 610. Curve 620 includes a second portion 620B wherein the inverter input voltage increases from the low level to a maximum inverter input voltage level at 622, as the load represented in load line 610 transitions from a light load to a heavy load. Curve 620 includes a third portion 620C that represents an operating condition where the inverter input voltage is at the maximum inverter input voltage level.

Curve 630 plots the power receiving device rectifier target output voltage as a function of rectifier output power. As shown, curve 630 includes a first portion 630A wherein the rectifier output power is low and the rectifier output voltage is designed to be regulated at a minimum target rectifier output voltage level for a light load, as shown in the leftmost portion of load line 610. Regulating the rectifier output voltage at the minimum target rectifier output voltage level may improve charging efficiency at light load because the inverter input voltage is maintained at a low voltage level (i.e., inverter input voltage curve first portion 620A).

Curve 630 includes a second portion 630B and a third portion 630B' wherein the rectifier output power is increasing, and the target rectifier output voltage is designed to increase from the minimum target rectifier output voltage level to a maximum target rectifier output voltage level 634 as the load transitions from a light load to a heavy load. However, due to a bad coupling between the power transmitter 12 and power receiver 24, the power receiver may not be able to regulate the rectifier output voltage at the target rectifier output voltage level illustrated in the third portion 630B[1] because the power transmitter inverter input voltage is at the maximum inverter input voltage level. In such case, the fourth portion 630C of curve 630 illustrates the power receiving device operating in a target rectifier output voltage fold back mode that is triggered at 632 when the power transmitting device inverter input voltage is at a maximum level and the load along line 610 continues to increase. The target rectifier output voltage fold back mode allows the target rectifier output voltage level to drop, and a control loop adaptively adjusts the target rectifier output voltage to a new target rectifier output voltage level as the load further increases along line 610. While in the target rectifier output voltage fold back mode, the power receiving device control circuitry 30 may require the target rectifier output voltage to not drop below a predetermined minimum fold back rectifier output voltage level, thereby ensuring the rectifier 50 produces at least a minimum rectifier output power.

The target rectifier output voltage fold back mode control loop algorithm is implemented in the power receiving device 24. During the wireless power transfer, the power transmitting device 12 may communicate information indicative of the inverter input voltage status to the power receiving device 24. For example, the information may be a message that indicates the inverter input voltage is at a maximum inverter input voltage level. Alternatively, the information may identify the inverter input voltage value. The communication may be in a packet that carries the inverter input voltage information. In another example, the information may be a one-bit flag in an existing data packet to indicate whether the inverter input voltage has reached a maximum level. The communication from the power transmitter 12 to the power receiver 24 may take place using frequency shift keying (FSK) technique as discussed above. Alternatively, other types of in-band or out-of-band communications may be used, if desired.

In another example, the power receiving device 24 may ask the power transmitting device 12 for information indicative of an operating condition of an inverter of the power transmitting device, wherein the wireless power transfer coil 48 is receiving wireless power signals transmitted by the wireless power transmitting device 12 using the inverter. In addition, the information may comprise a status indicative of whether the inverter of the wireless power transfer device 12 is operating at its maximum input voltage. If the power transmitting device 12 responds to the power receiving device 24 indicating that the inverter input voltage is at a maximum level, the power receiving device 24 may trigger the target rectifier output voltage fold back mode, as discussed above, to adaptively adjust the target rectifier output voltage while the inverter input voltage is at the maximum level.

Figure 7:
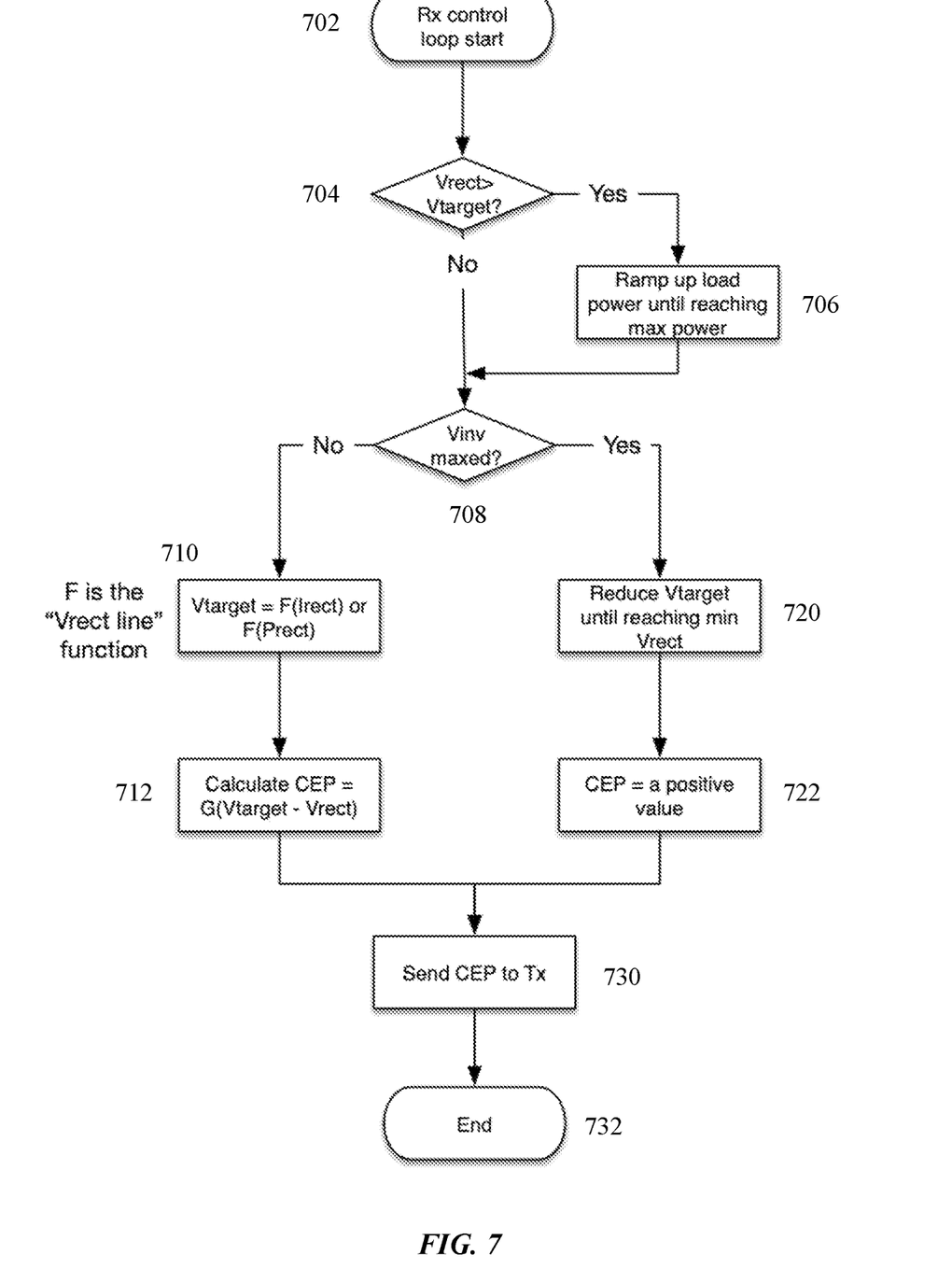
FIG. 7 is a flow diagram of an exemplary control loop algorithm implemented in the power receiving device of a wireless power transfer system using feedback control schemes illustrated in FIGS. 5 and 6.

FIG. 7 is a flow diagram of an exemplary control loop algorithm implemented in the power receiving device 24 of a wireless power transfer system using feedback control schemes 500 and 600 illustrated in FIGS. 5 and 6. The FIG. 7 flow diagram will first be discussed in connection with an exemplary operation of feedback control scheme 500 shown in FIG. 5.

In a wireless power system 8, a wireless power receiving device 24 is the master of communication and controls the power transfer in wireless power system 8. Receiving device 24 is configured to receive electromagnetic signals 44 from a wireless power transmitting device 12. Before and during power transfer, the receiving device 24 and transmitting device 12 may negotiate a maximum allowed power level. The power receiving device 24 includes a wireless power transfer coil 48. In addition, receiving device 24 includes rectifier circuitry 50 that is coupled to the wireless power transfer coil 48 and configured to rectify signals from a wireless power transfer coil into output voltage. Receiving device 24 also includes control circuitry 30 that is configured to regulate the rectifier output voltage a target output voltage level (e.g., 530A in FIG. 5), receive, from the transmitting device 12, a status message indicative of the inverter input voltage, and adjust the target rectifier output voltage based on the status of the inverter input voltage.

Referring to FIG. 7, step 704, receiving device 24 control circuitry 30 measures a present rectifier output voltage value (e.g., using circuitry 43) and determines if it is greater than or equal to the target voltage rectifier output level. If so, at step 706, the receiving device may ramp up the load power until reaching the maximum allowed power and proceeds to step 708. If the present rectifier output voltage value is less than the target rectifier output voltage level, the receiving device proceeds directly to step 708.

At step 708, receiving device 24 control circuitry 30 determines whether the inverter input voltage is at a maximum level, such as, an operating condition along inverter input voltage curve portion 520B in FIG. 5. For example, control circuitry 30 may make this determination based on a status message indicative of an inverter input voltage received from the transmitting device 12. In another example, the power receiving device 24 may ask the power transmitting device 12 for information indicative of the inverter input voltage status. In either example, if the status indicates the inverter input voltage is not at a maximum level (e.g., an operating condition along inverter input voltage curve first portion 520A in FIG. 5), receiving device 24 proceeds to step 710.

At step 710, control circuitry 30 regulates the rectifier output voltage at the target rectifier output voltage level. At step 712, control circuitry 30 calculates a Control Error Packet (CEP) to enable the power transmitting device to adjust the rectifier output voltage by providing feedback information for the power transmitting device. At step 730, receiving device 24 transmits the CEP to the transmitting device 12. The transmitting device 12 may use information in the CEP to adjust the inverter input voltage.

Referring to step 708, if receiving device 24 control circuitry 30 determines that the inverter input voltage status message indicates the inverter input voltage is at a maximum level (e.g., an operating condition along inverter input voltage curve second portion 520B in FIG. 5), the receiving device enters the target rectifier output voltage fold back mode (e.g., an operating condition along rectifier output voltage curve second portion 530B). At step 720, receiving device 24 control circuitry 30 measures a present rectifier output voltage value (e.g., using circuitry 43). While in the fold back mode, the present rectifier output voltage value may be below the target rectifier output voltage level. Therefore, receiving device 24 sets a new target rectifier output voltage level to the present rectifier output voltage value and regulates the rectifier output voltage at the new target rectifier output voltage level. At step 722, the receiving device 24 does not calculate a Control Error Packet (CEP); rather, the receiving device 24 assigns the CEP a value that asks the power transmitting device 12 for more power. The CEP request for more power may cause the transmitting device 12 increase the inverter input voltage, thereby ensuring that the inverter input voltage is kept at the inverter input voltage maximum level. At step 730, receiving device 24 transmits the CEP to the transmitting device 12.

While the inverter input voltage is at a maximum level, receiving device 24 will continue to operate in the target rectifier output voltage fold back mode (i.e., steps 720 and 722 in FIG. 7) and allow the rectifier output voltage to drop. The fold back mode enables the receiving device 24 to adaptively adjust the target rectifier output voltage level to a new target rectifier output voltage level as the load changes (e.g., an operating condition along rectifier output voltage curve second portion 530B). While in the fold back mode, receiving device 24 control circuitry 30 may require the target rectifier output voltage level to not drop below a minimum fold back voltage level. Receiving device 24 control circuitry 30 may compare the present rectifier output voltage value measured at step 720 with the minimum fold back voltage level. If control circuitry 30 determines the present rectifier output voltage value is less than the minimum fold back voltage level, control circuitry 30 may set the new target rectifier output voltage level to the minimum fold back voltage level, and regulate the rectifier output voltage at the new target rectifier output voltage level. By controlling the minimum rectifier output voltage level, receiving device 24 may ensure that rectifier 50 produces a minimum output power.

Receiving device 24 will stop operating in the fold back mode when, at step 704, the receiving device 24 control circuitry 30 determines the present rectifier output voltage value is greater than or equal to the target rectifier output voltage level (e.g., an operating condition along rectifier output voltage curve second portion 530A in FIG. 5). As such, the transmitting device 12 inverter input voltage will not be at a maximum level; rather, it will be in an operating condition along inverter input voltage curve first portion 520A in FIG. 5. At step 708, receiving device 24 will proceed to the control loop on left side of the FIG. 7 flow diagram to regulate the rectifier output voltage at the target output voltage level and calculate a CEP in accordance with steps 710 and 712.

The FIG. 7 flow diagram will next be discussed in connection with an exemplary operation of feedback control scheme 600 shown in FIG. 6. As noted above, feedback control scheme 600 may improve charging efficiency at a light load and includes the target rectifier output voltage fold back mode control loop.

In a wireless power system 8, a wireless power receiving device 24 is the master of communication and controls the power transfer in wireless power system 8. Receiving device 24 is configured to receive electromagnetic signals 44 from a wireless power transmitting device 12. Before and during power transfer, the receiving device 24 and transmitting device 12 may negotiate a maximum allowed power level. The power receiving device 24 includes a wireless power transfer coil 48. In addition, receiving device 24 includes rectifier circuitry 50 that is coupled to the wireless power transfer coil 48 and configured to rectify signals from the wireless power transfer coil into output voltage. Receiving device 24 also includes control circuitry 30 that is configured to measure a characteristic of the rectifier circuitry 50 (e.g., using circuitry 43). For example, the rectifier circuitry characteristic may be the rectifier output power and/or the rectifier output current.

Control circuitry 30 may determine and dynamically control a target rectifier output voltage level based on a function of the measured characteristic of the rectifier circuitry 50. For example, the target rectifier output voltage may be determined and controlled as a function of rectifier output power as shown in FIG. 6 curve 630. The target rectifier output voltage function (curve 630) may be designed for the best coupling condition (i.e., curve portions 630A, 630B, 630B') and allow for the target rectifier output voltage to fold back in worse coupling conditions (i.e., curve portion 630C). The target rectifier output voltage function may provide a low target rectifier output voltage at light load (e.g., low rectifier output power required) and a high target rectifier output voltage at a heavy load (e.g., high rectifier output power required).

Referring to FIG. 7 Step 704, receiving device 24 control circuitry 30 measures a present rectifier output power (e.g., using circuitry 43) and determines a target rectifier output voltage level as a function of the measured rectifier output power. Control circuitry 30 also measures a present rectifier output voltage value and determines if it is greater than or equal to the target voltage rectifier output level. If so, at step 706, the receiving device 24 may ramp up the load power until reaching the maximum allowed power and proceeds to step 708. If the present rectifier output voltage value is less than the target rectifier output voltage level, the receiving device proceeds directly to step 708.

At step 708, receiving device 24 control circuitry 30 determines whether the inverter input voltage is at a maximum level, such as an operating condition along inverter input voltage curve portion 620C in FIG. 6. For example, control circuitry 30 may make this determination based on a status message indicative of the inverter input voltage received from the transmitting device 12. In another example, the power receiving device 24 may ask the power transmitting device 12 for information indicative of the inverter input voltage status. In either example, if the status indicates the inverter input voltage is not at a maximum level, such as an operating condition along inverter input voltage curve portions 620A or 620B in FIG. 6, the receiving device 24 proceeds to step 710.

At step 710, control circuitry 30 regulates the rectifier output voltage at the target output voltage level determined as a function of the measured rectifier output power (e.g., an operating condition along design target rectifier output voltage portion 630A or 630B in FIG. 6). At step 712, control circuitry 30 calculates a Control Error Packet (CEP) to enable the power receiving device to adjust the rectifier output voltage by providing feedback information for the power transmitting device. At step 730, receiving device 24 transmits the CEP to the transmitting device 12. The transmitting device 12 may use information in the CEP to adjust the inverter input voltage.

Referring, again, to step 708, if receiving device 24 control circuitry 30 determines that the inverter input voltage status message indicates the inverter input voltage is at a maximum level (e.g., an operating condition along inverter input voltage curve portion 620C in FIG. 6), the receiving device enters the target rectifier output voltage fold back mode (e.g., an operating condition along rectifier output voltage curve portion 630C). At step 720, receiving device 24 control circuitry 30 measures a present rectifier output voltage value (e.g., using circuitry 43). While in the fold back mode, the present rectifier output voltage value may be below the target rectifier output voltage level. Therefore, receiving device 24 sets a new target rectifier output voltage level to the present rectifier output voltage value and regulates the rectifier output voltage at the new target rectifier output voltage level. At step 722, the receiving device 24 does not calculate a CEP; rather, the receiving device 24 assigns the CEP a value that asks the power transmitting device 12 for more power. The CEP request for more power may cause the transmitting device 12 increase the inverter input voltage, thereby ensuring that the inverter input voltage is kept at the inverter input voltage maximum level. At step 730, receiving device 24 transmits the CEP to the transmitting device 12.

While the inverter input voltage is at a maximum level, receiving device 24 will continue to operate in the target rectifier output voltage fold back mode (i.e., steps 720 and 722 in FIG. 7) and allow the rectifier output voltage to drop. The fold back mode enables the receiving device 24 to adaptively adjust the target rectifier output voltage level to a new target rectifier output voltage level as the load changes (e.g., an operating condition along rectifier output voltage curve portion 630C). While in the fold back mode, receiving device 24 control circuitry 30 may require the target rectifier output voltage level to not drop below a minimum fold back voltage level. Receiving device 24 control circuitry 30 may compare the present rectifier output voltage value measured at step 720 with the minimum fold back voltage level. If control circuitry 30 determines the present rectifier output voltage value is less than the minimum fold back voltage level, control circuitry 30 may set the new target rectifier output voltage level to the minimum fold back voltage level, and regulate the rectifier output voltage at the new target rectifier output voltage level. By controlling the minimum rectifier output voltage level, receiving device 24 may ensure that rectifier 50 produces a minimum rectifier output power.

The foregoing description is provided for the purpose of explanation and is not to be construed as limiting the invention. While the invention has been described with reference to illustrative examples or methods, it is understood that the words which have been used herein are words of description and illustration, rather than words of limitation. Furthermore, although the invention has been described herein with reference to particular structure, methods, and examples, the invention is not intended to be limited to the particulars disclosed herein, as the invention extends to all structures, methods and uses that are within the scope of the appended claims. Those skilled in the relevant art, having the benefit of the teachings of this specification, may effect numerous modifications to the invention as described herein, and changes may be made without departing from the scope and spirit of the invention as defined by the appended claims.

What is claimed:

1. A wireless power receiving device configured to receive wireless power signals from a wireless power transmitting device, the wireless power receiving device comprising:
   a wireless power transfer coil;
   rectifier circuitry coupled to the wireless power transfer coil and configured to rectify signals from the wireless power transfer coil into a rectifier output voltage; and
   control circuitry configured to:
      regulate the rectifier output voltage at a target rectifier output voltage level;
      receive, from the wireless power transmitting device, a status message indicative of an inverter input voltage of the wireless power transmitting device;
      determine, based on the status message received from the wireless power transmitting device, whether the inverter input voltage is at a maximum inverter input voltage level; and
      adjust the target rectifier output voltage level based on the status message indicative of the inverter input voltage, wherein in accordance with determining the inverter input voltage is at the maximum inverter input voltage level, the control circuitry:
         measures a present rectifier output voltage value; and
         compares the present rectifier output voltage value with a minimum fold back voltage level,
            wherein in accordance with determining the present rectifier output voltage value is less than or equal to the minimum fold back voltage level, the control circuitry sets a new target rectifier output voltage level to the minimum fold back voltage level; and
         regulates the rectifier output voltage at the new target rectifier output voltage level.

2. The wireless power receiving device of claim 1, wherein in accordance with determining the present rectifier output voltage value is greater than the minimum fold back voltage level, the control circuitry:
   sets the new target rectifier output voltage level to the present rectifier output voltage value; and
   regulates the rectifier output voltage at the new target rectifier output voltage level.

3. The wireless power receiving device of claim 1, wherein in accordance with determining the present rectifier output voltage value is greater than the minimum fold back voltage level, the control circuitry compares the present rectifier output voltage value with the target rectifier output voltage level.

4. The wireless power receiving device of claim 3, wherein in accordance with determining the present rectifier output voltage value is less than the target rectifier output voltage level, the control circuitry transmits a Control Error Packet (CEP) to the wireless power transmitting device to ask for more power.

5. The wireless power receiving device of claim 1, wherein the control circuitry determines from the status message that the inverter input voltage is not at the maximum inverter input voltage level, the control circuitry:
   regulates the rectifier output voltage at the target rectifier output voltage level.

6. A wireless power receiving device configured to receive wireless power signals from a wireless power transmitting device, the wireless power receiving device comprising:
   a wireless power transfer coil;
   rectifier circuitry coupled to the wireless power transfer coil and configured to rectify signals from the wireless power transfer coil into a rectifier output voltage; and
   control circuitry configured to:
      receive, from the wireless power transmitting device, a status message indicative of an inverter input voltage of the wireless power transmitting device;
      determine, based on the status message received from the wireless power transmitting device, whether the inverter input voltage is at a maximum inverter input voltage level,
      wherein in accordance with determining the inverter input voltage is not at the maximum inverter input voltage level, the control circuitry:

measures a characteristic of the rectifier circuitry;
determines a target rectifier output voltage level based on the measured characteristic of the rectifier circuitry; and
dynamically regulates the rectifier output voltage at the target rectifier output voltage level;
wherein in accordance with determining if the inverter input voltage is at the maximum inverter input voltage level, the control circuitry:
measures a present rectifier output voltage value;
compares the present rectifier output voltage value with a minimum fold back voltage level,
wherein in accordance with determining the present rectifier output voltage value is less than or equal to the minimum fold back voltage level, the control circuitry sets a new target rectifier output voltage level to the minimum fold back voltage level; and
regulates the rectifier output voltage at the new target rectifier output voltage level.

7. The wireless power receiving device of claim 6, wherein the characteristic of the rectifier circuitry comprises one of a rectifier output power and a rectifier output current.

8. The wireless power receiving device of claim 6, wherein in accordance with determining the present rectifier output voltage value is greater than the minimum fold back voltage level,
sets the new target rectifier output voltage level to the present rectifier output voltage value; and
regulates the rectifier output voltage at the new target rectifier output voltage level.

9. The wireless power receiving device of claim 6, wherein in accordance with determining the present rectifier output voltage value is greater than the minimum fold back voltage level, the control circuitry:
measures the characteristic of the rectifier circuitry;
determines the target rectifier output voltage level based on the measured characteristic of the rectifier circuitry; and
compares the present rectifier output voltage value with the target rectifier output voltage level.

10. The wireless power receiving device of claim 9, wherein the control circuitry determines the present rectifier output voltage value is less than the target rectifier output voltage level, the control circuitry transmits a Control Error Packet (CEP) to the wireless power transmitting device to ask for more power.

11. A wireless power receiving device configured to receive wireless power signals from a wireless power transmitting device, the wireless power receiving device comprising:
a wireless power transfer coil;
rectifier circuitry coupled to the wireless power transfer coil and configured to rectify signals from the wireless power transfer coil into a rectifier output voltage; and
control circuitry configured to:
ask the wireless power transmitting device for information indicative of an operating condition of an inverter of the wireless power transmitting device, wherein the wireless power transfer coil is receiving wireless power signals transmitted by the wireless power transmitting device using the inverter;
wherein the information comprises a status message indicative of whether the inverter of the wireless power transmitting device is operating at a maximum input voltage level;
wherein in accordance with determining the inverter input voltage is not at the maximum inverter input voltage level, the control circuitry:
regulates the rectifier output voltage at a target rectifier output voltage level;
wherein in accordance with determining the inverter input voltage is at the maximum inverter input voltage level, the control circuitry:
measures a present rectifier output voltage value;
compares the present rectifier output voltage value with a minimum fold back voltage level,
wherein in accordance with determining the present rectifier output voltage value is less than or equal to the minimum fold back voltage level, the control circuitry sets a new target rectifier output voltage level to the minimum fold back voltage level; and
regulates the rectifier output voltage at the new target rectifier output voltage level.

12. The wireless power receiving device of claim 11, wherein in accordance with determining the present rectifier output voltage value is greater than the minimum fold back voltage level, the control circuitry:
sets the new target rectifier output voltage level to the present rectifier output voltage value; and
regulates the rectifier output voltage at the new target rectifier output voltage level.

* * * * *